May 7, 1935.   T. E. HODGKINSON   2,000,594
TESTING DEVICE
Original Filed July 1, 1931

INVENTOR.
Thomas E. Hodgkinson
BY
ATTORNEY.

Patented May 7, 1935

2,000,594

UNITED STATES PATENT OFFICE 2,000,594

TESTING DEVICE

Thomas E. Hodgkinson, San Francisco, Calif., assignor to Newton J. Hale, San Francisco, Calif.

Application July 1, 1931, Serial No. 548,082
Renewed October 22, 1934

10 Claims. (Cl. 175—183)

The present invention relates to testing devices and concerns particularly devices for testing a plurality of elements of a cable or vacuum tube, or circuits of any electrical machine or system for short circuits between any pair thereof.

It is an object of the invention to provide apparatus for so testing a plurality of such elements or circuits simultaneously.

Another object of the invention is to provide apparatus whereby such a test may be effected upon mere connection of the elements to be tested to the testing apparatus without adjustment of moving parts.

Another object of the invention is to provide means whereby the short circuiting of any pair or pairs of elements or circuits will be registered by a single indicator.

Other objects will appear hereinafter.

One form of apparatus for carrying out these objects is shown in the accompanying drawing forming a part of this specification in which.

Figure 1:
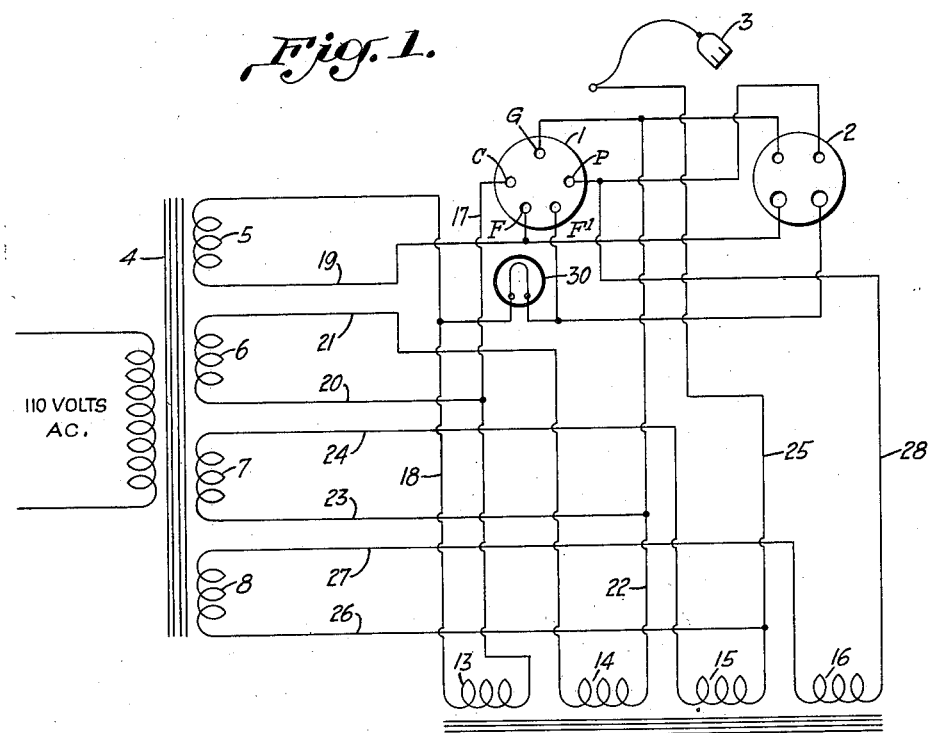
Figure 1 is a diagrammatic illustration of the testing device as applied in testing for short circuits in vacuum tubes.

In the form of the apparatus shown in Figure 1 of the drawing standard sockets such as shown at 1 and 2 are provided for receiving the various types of vacuum tubes which it is desired to test, and a cap 3 is provided for connection to the grid shield tap of certain types of tubes. These are provided merely for convenience in connecting the apparatus to the devices which it is desired to test, and may either be dispensed with, or other forms of connectors especially adapted to other devices or systems which it may be desired to test substituted or added.

To supply current for the operation of the apparatus a transformer 4 is provided, connected to an alternating current line, having a plurality of secondaries 5, 6, 7, and 8, the connections to which will be described hereinafter, and which are proportioned with respect to the primary to supply the proper current for the indicating devices.

The indicating devices may consist of any type of electrically operable signals, and are shown as comprising a buzzer 9 and signal lamp 10 connected in parallel to the secondary 11 of another transformer 12. This transformer 12 has a plurality of primaries 13, 14, 15, and 16, energization of any one or more of which will induce a current in the secondary 11 sufficient to operate the signals 9 and 10.

Each lead to an element of the device to be tested is connected to every other such lead through at least one secondary of transformer 4 and at least one primary of transformer 12.

The cathode contact C of socket 1 is connected to the filament contact F thereof by lead 17 to primary 13 of transformer 12, lead 18 to secondary 5 of transformer 4, and lead 19 to F; to plate contact P thereof by leads 17 and 20 to secondary 6 of transformer 4, lead 21 to primary 14 of transformer 12, leads 22 and 23 to secondary 7 of transformer 4, lead 24 to primary 15 of transformer 12, leads 25 and 26 to secondary 8 of transformer 4, lead 27 to primary 16 of transformer 12, and lead 28 to P; to the grid contact G thereof by leads 17 and 20 to secondary 6 of transformer 4, lead 21 to primary 14 of transformer 14 and lead 22 to G; and to the grid shield contact 3 thereof by leads 17 and 20 to secondary 6 of transformer 4, lead 21 to primary 14 of transformer 12, leads 22 and 23 to secondary 7 of transformer 4, lead 24 to primary 15 of transformer 12, and lead 25 to grid shield contact 3.

Similarly, the grid contact G of socket 1 is connected to the cathode contact C thereof as above set forth; to the filament contact F by lead 22 to primary 14 of transformer 12, lead 21 to secondary 6 of transformer 4, leads 20 and 17 to primary 13 of transformer 12, lead 18 to secondary 5 of transformer 4 and lead 19 to F; to the plate contact P thereof by leads 22 and 23 to secondary 7 of transformer 4, lead 24 to primary 15 of transformer 12, lead 26 to secondary 8 of transformer 4, lead 27 to primary 16 of transformer 12 and lead 28 to P; and to the grid shield contact 3 thereof by leads 22 and 23 to secondary 7 of transformer 4, lead 24 to primary 15 of transformer 12 and lead 25 to grid shield contact 3.

Similarly the plate contact P of socket 1 is connected to the cathode contact C and grid contact G thereof as above set forth; to the filament contact F thereof by lead 28 to primary 16 of transformer 12, lead 27 to secondary 8 of transformer 4, lead 26 to primary 15 of transformer 12, lead 24 to secondary 7 of transformer 4, lead 23 to primary 14 of transformer 12, lead 21 to secondary 6 of transformer 4, leads 20 and 17 to primary 13 of transformer 12, lead 18 to secondary 5 of transformer 4 and lead 19 to F; and to grid shield contact 3 thereof by lead 28 to primary 16 of transformer 12, lead 27 to secondary 8 of transformer 4, and leads 26 and 25 to grid shield contact 3.

Finally, filament contact F of socket 1 is connected to cathode contact C, grid contact G, and plate contact P thereof as above set forth, and to grid shield contact 3 thereof by lead 19 to secondary 5 of transformer 4, lead 18 to primary 13 of transformer 12, leads 17 and 20 to secondary 6 of transformer 4, lead 21 to primary 14 of transformer 12, leads 22 and 23 to secondary 7 of transformer 4, lead 24 to primary 15 of transformer 12, and lead 25 to grid shield contact 3.

The contacts of socket 2, which is connected in parallel with socket 1, are thus connected together by the same circuits.

Figure 2:
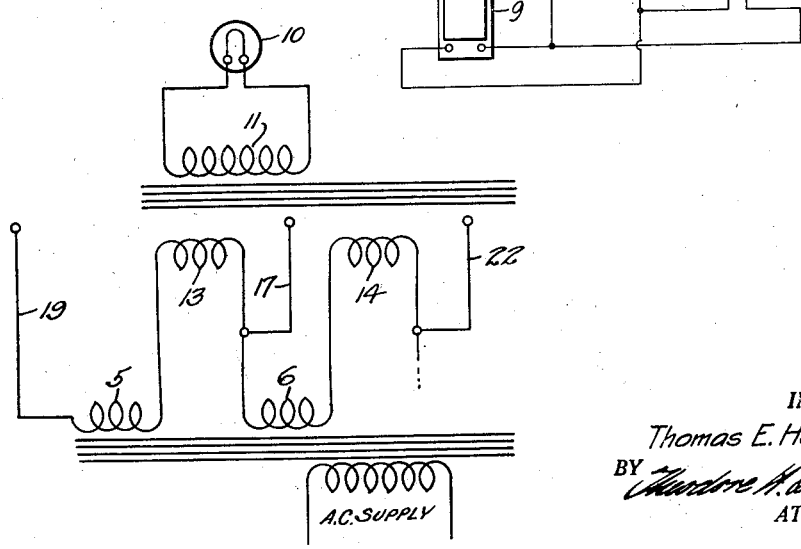
Figure 2 is a diagram of the essential connections in simplified arrangement.

In Figure 2 of the drawing these connections are shown in simpler arrangement, the same reference numerals being applied throughout. It will thus be apparent that, in its essentials, the exemplary circuit comprises a plurality of supply transformer secondaries connected in alternate series with a plurality of indicator transformer primaries, and that the capacity of the apparatus may be extended in an obvious manner.

It will be noted from the connections above set forth that the number of secondaries of transformer 4 and primaries of transformer 12 connected in series between any pair of the testing contacts is always equal and that therefore the ratio of the primary of transformer 4 to the secondary of transformer 12 is always the same. In this connection, it is important to note that the secondaries of transformer 4 are all arranged in the same phase relation, so as to constitute in effect a single tapped secondary and that the primaries of transformer 12 are arranged in the same manner. Thus, the ultimate effect is that, though the effective number of turns in the secondary of transformer 4 may be increased by the inclusion of a plurality of the separate secondaries in the circuit, the effective number of turns in the primary of transformer 12 will be correspondingly increased by the inclusion of an equal number of the separate primaries in the circuit, and the voltage induced in secondary 11 will remain the same, and there will be no danger of damaging the signals 9 and 10.

An indicator lamp 30 is connected in series with the filament contacts F and F' to the secondary 5 of transformer 4, as shown, and will be lighted if the filament of an inserted tube is in operative condition.

In operation, a tube to be tested is placed in either socket 1 or 2 and cap 3 connected thereto if a tap for such connection is provided. If the filament circuit is complete, lamp 30 will be lighted through the circuit described above, and if the elements are all properly insulated from each other there will be no further indication. However, a short circuit between any pair or pairs of elements will, through one or more of the circuits outlined above, permit current to flow in one or more of the primaries of transformer 12, inducing a current in the secondary 11 sufficient to operate signals 9 and 10.

While the apparatus has been described herein as especially adapted to testing vacuum tubes, it is understood that it is also adapted to testing any sort of electrical device or system, and that the invention is limited only by the fair scope of the appended claims.

I claim:

1. In a device of the class described, a single source of current, a series of three or more leads associated therewith, a closed indicating circuit, and means controlled by passage of current between any combination of said leads for inducing current in said indicating circuit.

2. In a device of the class described, a closed circuit, a series of three or more leads, and means controlled by passage of current between any combination of said leads for inducing current in said circuit.

3. In a device of the class described, a single source of current, a signal, and means for controlling said signal from any of a plurality of circuits comprising a transformer having a plurality of primary windings, a secondary winding controlling the operation of said signal, and means for maintaining a constant voltage in said secondary winding irrespective of the number of said primary windings energized in series.

4. In a device of the class described, a supply transformer having a plurality of secondary windings, a second transformer having a plurality of primary windings, and a series of leads so arranged that a connection between various combinations thereof will connect a varying number of secondary windings of said supply transformer with an equal number of primary windings of said second transformer.

5. In a device of the class described, a supply transformer having a primary winding and a plurality of secondary windings, a second transformer having a plurality of primary windings and a secondary winding, and means comprising leads adapted for interconnection, for energizing various numbers of the primary windings of said second transformer while maintaining constant the ratio between the primary of said supply transformer and the secondary of said second transformer.

6. In a device of the class described, a supply transformer having a plurality of secondary windings, a signal operable by any of a plurality of magnetic devices, and a series of three or more testing leads between said windings and said devices so arranged that passage of current between any combination of said leads will cause operation of one or more of said devices.

7. A testing circuit comprising a supply transformer having a plurality of secondary windings, an output transformer having a plurality of primary windings, said primary and secondary windings being connected in groups alternately in series, and test leads connected to the termini of each such group.

8. A testing circuit comprising a supply transformer having a plurality of secondary windings, an output transformer having an equal number of primary windings, said primary and secondary windings being connected in groups alternately in series, and test leads connected to the termini of each such group.

9. A testing circuit comprising a supply transformer having a plurality of secondary windings, an output transformer having a plurality of primary windings, said primary and secondary windings being connected in groups alternately in series, test leads connected to the termini of each such group, and indicating means controlled by said output transformer.

10. A testing circuit comprising a supply transformer having a plurality of secondary windings, an output transformer having an equal number of primary windings, said primary and secondary windings being connected in groups alternately in series, test leads connected to the termini of each such group, and indicating means controlled by said output transformer.

THOMAS E. HODGKINSON.